Patented Jan. 19, 1954

2,666,523

UNITED STATES PATENT OFFICE 2,666,523

PACKAGING METHOD

Edward J. Ryan, Elizabeth, N. J., and William C. Van Siclen, Douglaston, N. Y., assignors to Standard Oil Development Company, a corporation of Delaware No Drawing. Application November 1, 1951, Serial No. 254,446

11 Claims. (Cl. 206—84)

This invention relates to improved methods for packaging plastic materials which are tacky and have substantial cold-flowing tendencies and which adhere strongly to package containers. One important application of the invention is in packaging the synthetic polymers made by the low-temperature polymerization of isobutylene either alone or with another olefin.

The polymers to which this invention is particularly applicable are those produced synthetically. These include both high and low molecular weight synthetic polymers, and especially the hydrocarbon polymers. Examples are the homopolymers, such as polyisobutylene, polyacrylic esters, etc., as well as copolymers such as butadiene and acrylonitrile copolymers, isoolefin-multiolefin copolymers such as those prepared from a major proportion of isobutylene and a minor proportion of a conjugated diolefin, and isoolefin-olefin copolymers such as copolymers of isobutylene and ethylene or styrene. The low molecular weight polymers are, as a rule, more tacky and more subject to cold-flow and so require more care in packaging.

Being tacky and subject to cold-flow, these raw, synthetic polymers adhere strongly to the conventional packaging materials such as paper bags, cardboard boxes and metal containers. Removal of such polymers from conventional containers requires time-consuming and expensive procedures. In spite of the drastic procedures, as much as 20% of the polymer may remain because of incomplete removal of the polymer from the container. Furthermore, containers from which polymers have been removed are frequently bent and torn such that they may not be reused. Another method which may be employed consists of externally heating the can with steam, drilling a hole in the bottom, and blowing out the polymer.

The tackiness problem is particularly serious with polyisobutylene polymers of from 5,000 to 50,000 Staudinger molecular weight, and, even up to 200,000, although to a lesser extent. The polymers of molecular weight below about 5,000 are also troublesome although the viscosity of such material is sufficiently low that gravity removal from the containers is usually possible.

It has been suggested to use materials which are compatible with the polymer or copolymer as a coating or film on the container walls. However, this method has numerous disadvantages since, with the passage of time, the coating materials permeate the polymer mass, resulting in limited effectiveness and contamination of the packaged polymer. The unequal shrinkage of these films, when used on the polymeric mass, during unavoidable changes in temperature, is undesirable. In addition, these liners, which have been used to coat only the inner surfaces of the containers, do not protect the uncalendered edges of the container. Such materials as castor oil, waxes and glycerine have been suggested for this purpose.

According to the present invention, these synthetic polymers and other tacky materials are packaged in containers of metal, paper, cardboard, or other material, the inside surfaces of which have been previously coated with polyvinyl ether resin film. The molecular weight of the polyvinyl ether resin employed is chosen such that the film formed is viscous, tacky and does not form a hard, dry film. The polyvinyl ether resin preferentially wets the container surfaces and, being non-compatible with the polymer to be packaged therein, permits easy removal of the polymer by forming an interface between it and the container. It should be noted that the coatings are neither physically nor chemically compatible with the synthetic hydrocarbon polymers or other tacky material stored or shipped therein, so that after storage and shipment, the polymeric material may be removed conveniently and completely from the container without contamination of the polymer product. Being incompatible with the polymers, the coatings may, if desired, be removed from the polymers by using a solvent in which the polyvinyl ether resin is soluble and the polymer is insoluble, such as alcohols, ketones, etc. Thus, the invention provides an economical and easy method for preventing tacky polymers from adhering to container walls and facilitates the removal of such polymers from shipping and storage containers.

The application of the polyvinyl ether resin coating to the surfaces which are to be contacted with the tacky polymers can best be accomplished by applying to the surfaces, a solution of the polyvinyl ether resin in a suitable solvent.

The vinyl ether resins which are suitable for these coating films can be selected from a variety of vinyl ethers. They may include resins made from vinyl alkyl ethers such as vinyl isobutyl ether, vinyl isopropyl ether, vinyl octyl ether, vinyl lauryl ether, or vinyl octadecyl ether, etc. Methoxy vinyl ethers can also be used. In general, the polyvinyl ether resins employed in the carrying out of the invention are prepared from polyvinyl ethers having the general formula:

$$C=C-O-R$$

where R can be either a hydrocarbon or an alkoxy radical, and can have from 1 to 20 carbon atoms. These polyvinyl ethers range from viscous fluids to resins in consistency. These materials generally can be prepared having molecular weights between 10,000 and 100,000. For use as a coating material, the polyvinyl ether resin should have a molecular weight of at least 20,000. For the purpose of this invention the material must have substantial solubility in light hydrocarbon solvents so that they can be satisfactorily sprayed onto the surface leaving a tacky, viscous film of the resin by the evaporation of the solvent. Thus, the resins can be of any type, so long as their solutions are processable.

Solvents which can be successfully employed include those of the hydrocarbon type such as hexane, heptane, "Varsol," and mineral paint thinners. The polyvinyl ether resins must be easily miscible therein, and the solvent must be sufficiently volatile to evaporate readily from the surface after application thereon, leaving a clean film of the polyvinyl coating on all surfaces contacting the polymer.

With hexane, a suitable solution may be made using from 1.0 weight per cent to 15 weight per cent of the polyvinyl ether resin, although a concentration of about 3 weight per cent is most satisfactory and is preferred.

*Example*

Tests were performed on glass, metals, and "Bulkan" containers. The inner surfaces of the tested containers were sprayed with a 3 weight per cent solution of polyvinyl isobutyl ether resin in hexane. The hexane was allowed to evaporate, leaving a thin, tacky film of polyvinyl ether resin. The treated containers were then filled with polyisobutylene which was at a temperature of 300° F. The polyisobutylene samples used had molecular weights in the range of 10,000 to 17,000 and were prepared by the low temperature polymerization of isobutylene with a $BF_3$ catalyst. Upon cooling to room temperature, examination showed that the polymer could easily be pulled from the sides of the treated materials. Analyses of the polymer in contact with the resin coating and of the polymer from the middle of the container showed no marked differences in polymer composition. In all cases the polyvinyl resin served as a liner coating for the prevention of polyisobutylene adhesion to the treated container materials, and the polymer mass could be dumped or pulled directly from the container which remained clean.

What is claimed is:

1. The process of packaging an isobutylene polymer having tacky, cold-flowing characteristics, which comprises packing it in a container, the inner surfaces and edges of which have been coated with a polyvinyl ether resin having a molecular weight of at least 20,000.

2. The method of packaging a homopolymer material having tacky, cold-flowing characteristics in a packing container which comprises contacting the inner surfaces and edges of said container with a solution of a polyvinyl ether resin in a volatile solvent, permitting the solvent to evaporate, thereby leaving a coating of the polyvinyl ether on the surfaces and edges of said container, and thereafter placing said plastic material in said thus-treated container from which said plastic mass can be readily removed without appreciable adherence of plastic to the container surfaces.

3. A process according to claim 2 in which the plastic material is polyisobutylene having an average Staudinger molecular weight in the range of 5,000 to 50,000.

4. The method of packaging a raw synthetic rubbery polymer containing a major proportion of polymerized isobutylene mixture, which comprises packing said polymer in a container, the inner surfaces and edges of which have been coated with a film of a polyvinyl ether resin.

5. The process of packaging a homopolymer material having tacky, cold-flowing characteristics in a container, the surfaces of which have been coated with a polyvinyl ether resin substantially non-compatible with the homopolymer material.

6. A process according to claim 5 in which the homopolymer is a polyisobutylene.

7. A process according to claim 5 in which the polyvinyl ether resin is polyvinyl isobutyl ether resin.

8. A package which consists of a container coated on the surfaces and edges with a thin, protective polyvinyl ether resin film, and a plastic material having tacky, cold-flowing characteristics contained therein, the plastic material being substantially non-compatible with said protective film and being in contact with the container only at the surfaces having said protective film.

9. A package which consists of a container coated on the surfaces and edges with a thin, protective polyvinyl ether resin film, and a tacky, cold flowing synthetic isobutylene containing polymer contained therein, the polymer being substantially non-compatible with said protective film and being in contact with the container only at the surfaces having said protective film.

10. A package which consists of a container coated on the surfaces and edges with a thin protective polyvinyl ether resin film, said resin having a molecular weight of at least 20,000, and a tacky, cold-flowing polyisobutylene polymer contained therein, the polymer being substantially non-compatible with said protective film and being in contact with the container only at the surfaces having said protective film.

11. A package which consists of a container coated on the surfaces and edges with a thin protective polyvinyl ether resin film, and a tacky, cold flowing polyisobutylene polymer having an average Staudinger molecular weight in the range of 5,000 to 50,000 contained therein, the polymer being substantially non-compatible with said protective film and being in contact with the container only at the surfaces having said protective film.

EDWARD J. RYAN.
WILLIAM C. VAN SICLEN.

References Cited in the file of this patent

UNITED STATES PATENTS

| Number | Name | Date |
|---|---|---|
| 2,163,228 | Jorling | June 20, 1939 |
| 2,188,331 | Coggeshall | Jan. 30, 1940 |
| 2,310,712 | Schmied | Feb. 9, 1943 |
| 2,396,633 | Bernstein | Mar. 19, 1946 |
| 2,480,352 | Bicknell | Aug. 30, 1949 |

FOREIGN PATENTS

| Number | Country | Date |
|---|---|---|
| 402,877 | Great Britain | Dec. 14, 1933 |